under 35 U.S.C. 154(b) by 0 days.

(12) United States Patent
Li et al.

(10) Patent No.: US 11,251,710 B2
(45) Date of Patent: Feb. 15, 2022

(54) MULTI-PORT DC/DC CONVERTER SYSTEM

(71) Applicants: Yunwei Li, Edmonton (CA); Zhongyi Quan, Edmonton (CA)

(72) Inventors: Yunwei Li, Edmonton (CA); Zhongyi Quan, Edmonton (CA)

(*) Notice: Subject to any disclaimer, the term of this patent is extended or adjusted under 35 U.S.C. 154(b) by 0 days.

(21) Appl. No.: 17/088,812

(22) Filed: Nov. 4, 2020

(65) Prior Publication Data

US 2021/0135577 A1 May 6, 2021

Related U.S. Application Data

(60) Provisional application No. 62/930,329, filed on Nov. 4, 2019.

(51) Int. Cl.
*H02M 3/158* (2006.01)
*H02M 1/14* (2006.01)

(52) U.S. Cl.
CPC .......... *H02M 3/1584* (2013.01); *H02M 1/14* (2013.01); *H02M 3/158* (2013.01); *H02M 3/1582* (2013.01); *H02M 3/1586* (2021.05)

(58) Field of Classification Search
CPC .. H02M 3/158; H02M 3/1582; H02M 3/1584; H02M 3/1586
See application file for complete search history.

(56) References Cited

U.S. PATENT DOCUMENTS

| | | | |
|---|---|---|---|
| 9,825,545 B2* | 11/2017 | Chen | H02M 3/158 |
| 2014/0268946 A1* | 9/2014 | Liu | H02M 3/1582 363/60 |
| 2016/0072387 A1* | 3/2016 | Schmalnauer | H02M 3/158 323/271 |
| 2018/0123341 A1* | 5/2018 | Lehn | H02J 1/102 |
| 2018/0175732 A1* | 6/2018 | Dai | G05F 3/205 |
| 2020/0350820 A1 | 11/2020 | Grbovic et al. | |
| 2020/0412239 A1 | 12/2020 | Grbovic et al. | |

* cited by examiner

*Primary Examiner* — Gary A Nash
(74) *Attorney, Agent, or Firm* — Blue Filament Law PLLC

(57) ABSTRACT

A non-isolated multiport DC/DC converter topology is provided. The non-isolated multiport DC/DC converter topology is modular and can incorporate an unlimited number of independent input or output ports. The efficiency of the non-isolated multiport DC/DC converter topology is improved through partial power processing techniques without having isolation in the converter. The non-isolated multiport DC/DC converter topology also provides a balanced DC neutral point, making it an ideal candidate for bipolar DC grid or as the front-end of a multilevel DC/AC converter.

17 Claims, 16 Drawing Sheets

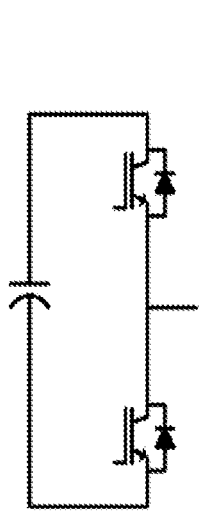
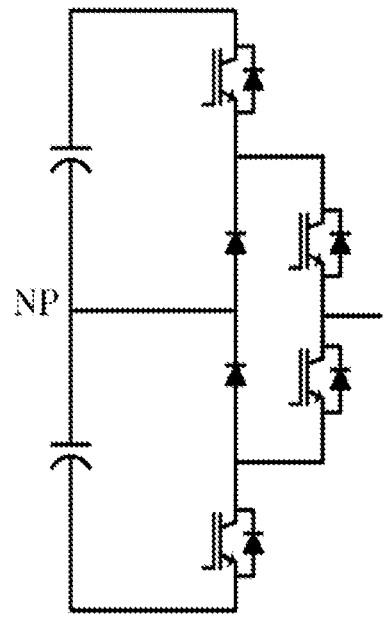
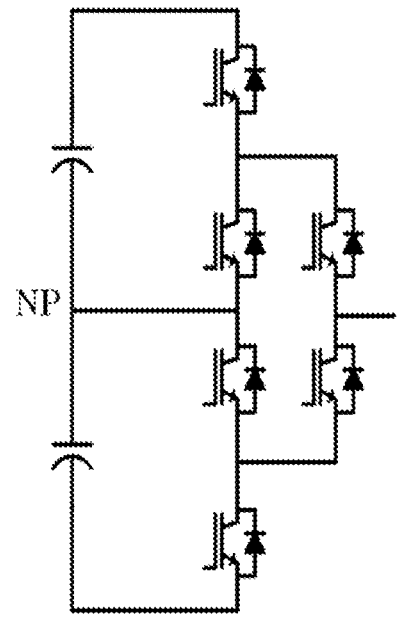
FIG. 6A          FIG. 6B          FIG. 6C
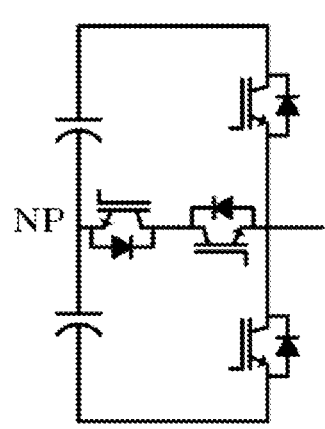
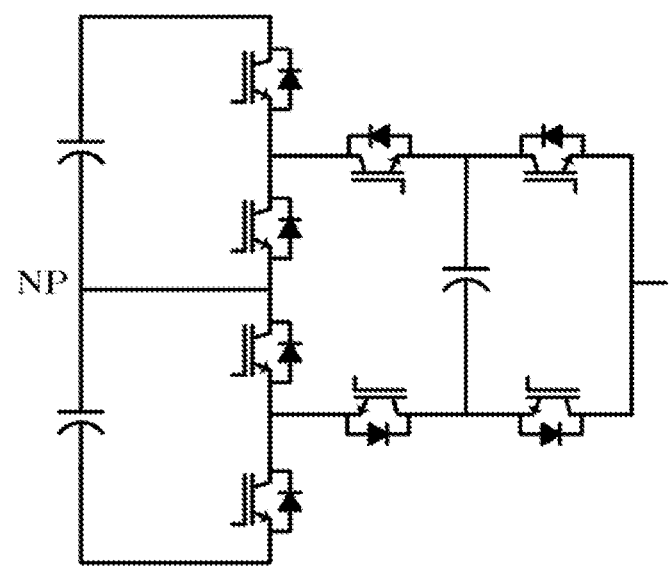
FIG. 6D          FIG. 6E

US 11,251,710 B2

MULTI-PORT DC/DC CONVERTER SYSTEM

CROSS REFERENCE TO RELATED APPLICATIONS

This application claims priority benefit of U.S. Provisional Application Ser. No. 62/930,329 filed 4 Nov. 2019, the contents of which are hereby incorporated by reference.

FIELD OF THE INVENTION

The present invention in general relates to DC converters and in particular to a non-isolated modular DC/DC converter having high efficiency as well as a DC/DC stage having multiple commonly grounded inputs or outputs that are independently switchable.

BACKGROUND OF THE INVENTION

A Non-isolated DC/DC converter is typically required in applications like DC microgrid, energy storage, solar photovoltaic (PV) systems, electric vehicle (EV) drives, smart homes, etc. Besides the requirement on efficiency, many of these applications demand that the DC/DC stage should have multiple commonly grounded inputs or outputs. However, with existing DC/DC converter topologies, it has been very challenging to fulfill both requirements at the same time.

Existing non-isolated multiport topologies are limited in the number of achievable input or output ports. Typically, only three-port or four-port topologies are achievable [1-7]. If the number of ports is large, the topologies and control will become very complicated and thus impractical. Moreover, with the existing topologies, the inputs or outputs have to be coupled with each other. For example, the voltages of the inputs have to be the same or follow a certain rule. In addition, the input ports in the existing topologies cannot be switched on or off individually [1-7]. Otherwise, the converters will not function. As a consequence, existing converters do not have the feature of modularity. Even though some converters may be built with repeated switch cells, these converters cannot function as a modular converter due to the coupling among the inputs or outputs. Isolated power converters are usually unnecessary in the above mentioned applications.

Furthermore, it has been challenging to design a highly efficient multiport converter with existing multiport topologies. For example, the number of devices is usually high in a multiport converter, leading to relatively lower efficiency. In addition, existing topologies all process full power that is transferred between the sources and loads. As a result, the total power loss is substantial. One potential solution to overcome this challenge is the partial power processing technique, with which the power converter only processes part of the power that is transferred from source to load. Therefore, the total power loss of the system can be reduced with equally efficient converters. However, partial power processing normally requires that part of the system is galvanically isolated [8, 9]. Galvanic isolation is undesirable as isolated converters usually have lower efficiency, lower density, but higher cost than non-isolated ones [10]. Also, the system cannot really have galvanic isolation since the other part of the converter is typically non-isolated. Moreover, isolation is usually unnecessary in the above mentioned applications. More importantly, none of the existing partial power processing converter systems can actually incorporate multiple independent inputs or outputs.

Thus, there exists a need for a non-isolated modular DC/DC converter having high efficiency as well as a DC/DC stage having multiple commonly grounded inputs or outputs that are independently switchable.

SUMMARY OF THE INVENTION

A non-isolated DC converter is provided. The non-isolated DC converter includes one or a plurality of DC input sources or loads, a balancing circuit for a set of output DC capacitors, and a buck-boost converter. The buck-boost converter is connected to half of the set of output DC capacitors, where the buck-boost converter is configured to only processes partial power of the non-isolated DC converter and is configured to interface each DC input source or load of the one or a plurality of DC input sources or loads.

BRIEF DESCRIPTION OF THE DRAWINGS

The present invention is further detailed with respect to the following drawings that are intended to show certain aspects of the present invention but should not be construed as a limit on the practice of the present invention.

FIGS. 6A-6G show applicable DC/AC topologies according to embodiments of the present invention;

DESCRIPTION OF THE INVENTION

The present invention has utility as providing a new non-isolated multiport DC/DC converter topology that overcomes the above challenges. As compared to existing non-isolated topologies, the inventive topology is modular and can incorporate an unlimited number of independent input or output ports. Furthermore, efficiency is improved through partial power processing techniques without having isolation in the converter. Besides the above main features, the inventive topology also provides a balanced DC neutral point, making it an ideal candidate for bipolar DC grid or as the front-end of a multilevel DC/AC converter.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Figure 1A:
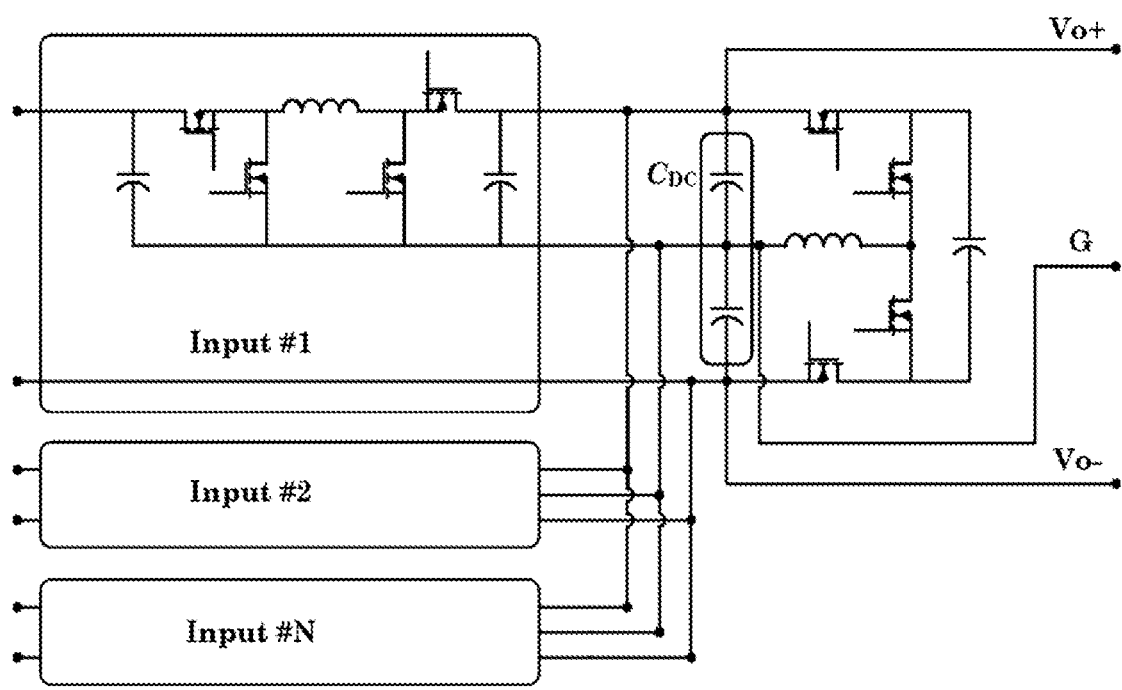
FIG. 1A shows a basic topology with N inputs and single balancing circuit according to embodiments of the present invention.
Figure 1B:
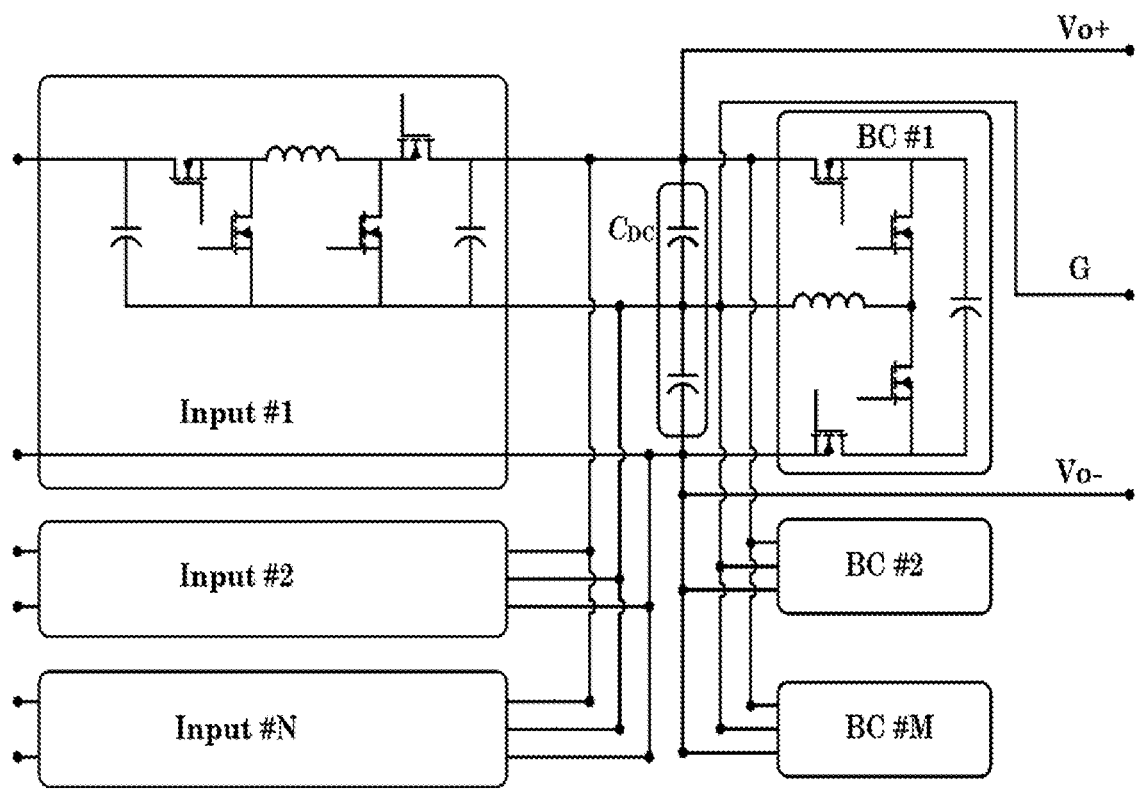
FIG. 1B shows a generalized topology with N inputs and M balancing circuits (BC) according to embodiments of the present invention.

According to embodiments of the multi-input DC/DC converter, a buck-boost converter that only processes half power is used to interface each DC source or load. The DC sources or loads are commonly grounded. Multiple buck-boost converters are connected in parallel and are connected to the upper DC capacitor of the balancing circuit to form a merged multi-input DC/DC stage. According to embodiments, the balancing circuit is a single converter, as shown in FIG. 1A, or multiple parallel converters as shown in FIG. 1B. The buck-boost converters can be further interleaved to reduce total output current ripple [11]. If multiple balancing circuits are employed, the balancing circuits can also be interleaved to reduce the inductor size [12]. It should be noted that although the buck-boost converter shown in FIGS. 1A and 1B are bidirectional, a unidirectional buck-boost converter can also be applied for all or some inputs depending on the requirement of application. Finally, the plurality of input sources can be combined as one single source. For example, in an EV, a hybrid battery unit may be integrated with the inventive DC/DC converter. Even when several types of batteries are used, they are usually packed in one module. As such, the system can be considered as multi-port, but single input source case.

Principle of Operation

Figure 2:
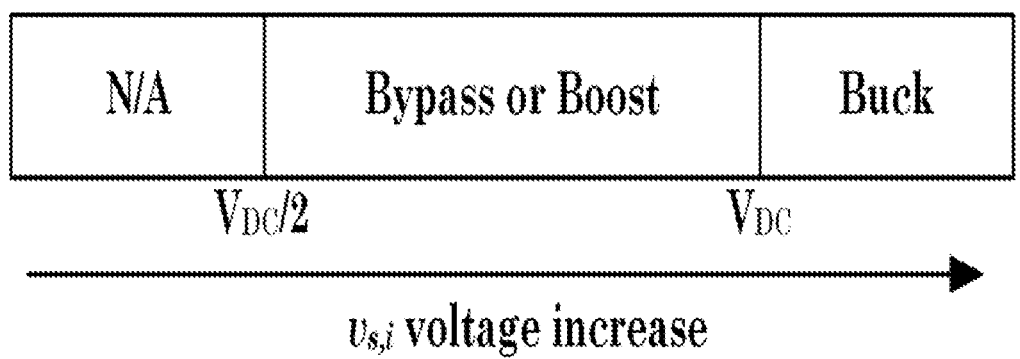
FIG. 2 shows the principle of operation of the DC/DC converter according to embodiments of the present invention.

In the following, $v_{s,i}$ denotes the voltage of the ith DC source or load, $V_{DC}$ is the desired DC link voltage of the DC/AC stage. The operating principle of the inventive DC/DC converter is shown in FIG. 2. If $v_{s,i}$ is lower than $V_{DC}/2$, the interfacing buck-boost converter of the DC/DC converter will not function. If $v_{s,i}$ is higher than $V_{DC}/2$ but lower than $V_{DC}$, the interfacing converter of the DC/DC converter operates in boost mode so that the voltage ($v_{s,i}$-$V_{DC}/2$) is boosted to $V_{DC}/2$. If $v_{s,i}$ is higher than $V_{DC}$, the interfacing converter of the DC/DC converter operates in buck mode to step ($v_{s,i}$-$V_{DC}/2$) to $V_{DC}/2$. In all cases, the balancing circuit will operate in open-loop with 50% duty cycle switching to function as a voltage doubler. Therefore, as long as the upper capacitor voltage is $V_{DC}/2$, the DC link voltage can be maintained at $V_{DC}$.

Power Processing Analysis

The power processing analysis is carried out through a superposition principle. Thus, boost and buck conversion can be analyzed separately. In the following analysis, $V_{IN}$ denotes the input voltage and $V_{DC}$ is the total output DC link voltage, D is the duty ratio of the buck boost converter, and $I_{IN}$ is the input current (also can be the output current if the unipolar side is the load, but is only denoted as an input for simplicity).

In boost operation, the voltage gain is written as shown in Equation 1. The voltage gain in buck conversion is written as shown in Equation 2.

$$\frac{V_{DC}}{V_{IN}} = \frac{2}{2-D} \qquad \text{Equation 1}$$

$$\frac{V_{DC}}{V_{IN}} = \frac{2D}{1+D} \qquad \text{Equation 2}$$

The input power $P_{IN}$, the power processed by the buck-boost converter $P_{BB}$, and the power processed by the balancing circuit $P_{BC}$ are given in Equations 3 to Equation 5.

$$P_{IN} = V_{IN} I_{IN} \qquad \text{Equation 3}$$

$$P_{BB} = \left(V_{IN} - \frac{V_{DC}}{2}\right)I_{IN} \qquad \text{Equation 4}$$

$$P_{BC} = |P_{IN} - 2P_{BB}| \qquad \text{Equation 5}$$

The ratio between the power processed by the converter and the input power is denoted as β Equation 6.

$$\beta = \frac{P_{BB} + P_{BC}}{P_{IN}} = \frac{V_{IN} - \frac{V_{DC}}{2} + |V_{DC} - V_{IN}|}{V_{IN}} \qquad \text{Equation 6}$$

If $V_{DC} > V_{IN}$, the converter operates in boost mode, and β is modified as in Equation 7. Based on Equation 1, the maximum value of $V_{DC}/V_{IN}$ is 2, indicating 100% of input power is processed by the converter. The duty ratio D is 1, suggesting that the boost converter is bypassed, and only the balancing circuit is operating. Therefore, all the input power is injected into the lower DC capacitor and the balancing circuit will process all that power. This operation mode occurs when the input voltage $V_{IN}$ is low, which in real world applications usually means that the input power is low, though full power is processed by the converter. When input power is large and $V_{IN}$ is high, the power processed by the converter will be reduced. The minimum amount of power processed by the converter is 50%, which happens when the input power is at its largest.

$$\beta = \frac{V_{DC}}{2V_{IN}} \qquad \text{Equation 7}$$

If $V_{DC} < V_{IN}$, the converter operates in buck mode, and β in this case is given in Equation 8. It can be seen from Equation 2 that when the buck-boost converter is bypassed, i.e., D is 1, $V_{DC}/V_{IN}$ becomes 1, and β is 50%. However, when D is 0, 200% of input power will be processed by the converter. Therefore, this conversion ratio is undesirable. Based on Equation 8, the converter processes full power when $V_{DC}/V_{IN}=2/3$. This limit is taken into consideration when designing a system according to the present invention. Fortunately, most multi-port applications do not require high ratio step-down conversion. For instance, in 1500V photovoltaic (PV) applications, the maximum string voltage, i.e., $V_{IN}$, can be 1500V. The minimum allowed DC voltage $V_{DC}$ can be 1300V. Therefore, at this extreme condition, the maximum power processed by the converter is only 70% of the total input power.

$$\beta = 2 - \frac{3}{2}\frac{V_{DC}}{V_{IN}} \qquad \text{Equation 8}$$

Figure 3A:
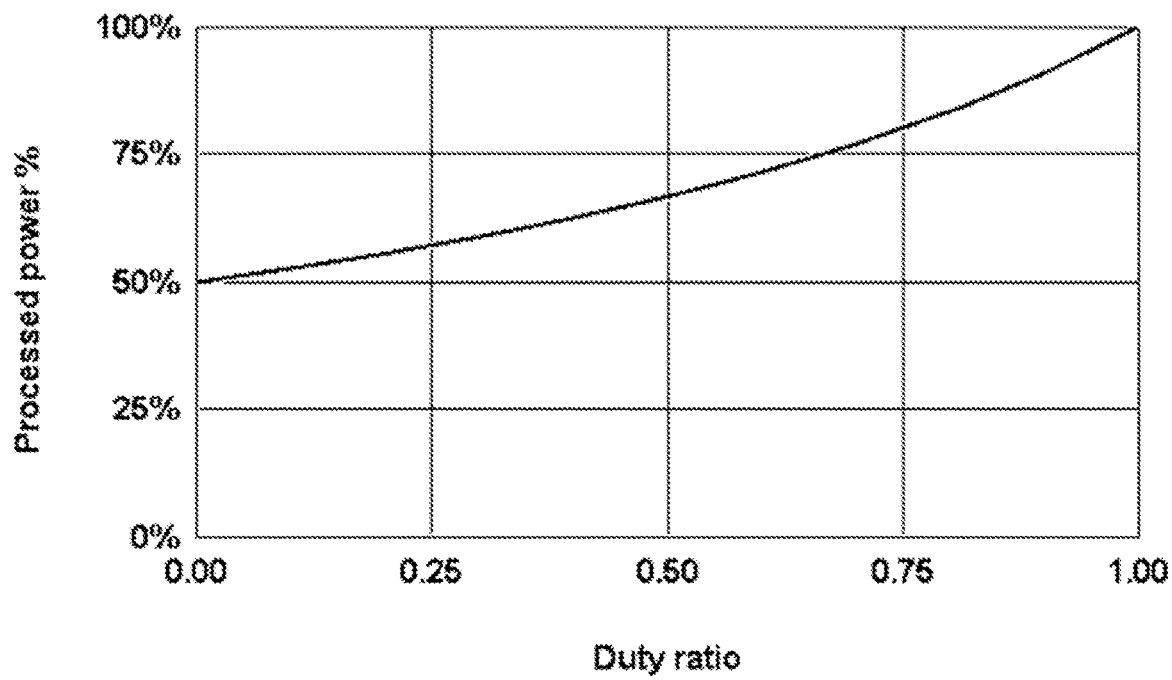
FIG. 3A is a graph showing the percentage of processed power as a function of duty ratio of a boost operation according to embodiments of the present invention.
Figure 3B:
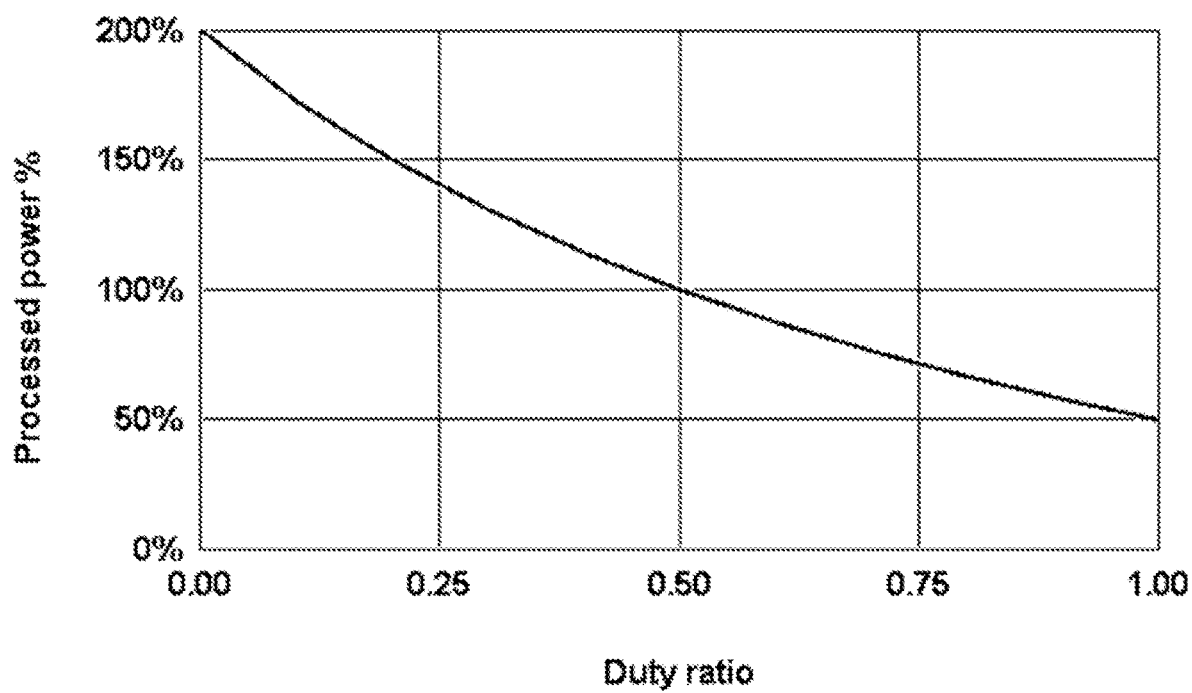
FIG. 3B is a graph showing the percentage of processed power as a function of duty ratio of a buck operation according to embodiments of the present invention.

In summary, the inventive converter does not need to process full power in most application ranges. In boost operation, the converter processes full input power only in a low power condition. Therefore, full power processing does not lead to high energy loss. In buck operation, the voltage step-down range should be limited to 2/3, which can be naturally satisfied in most applications. The value of β in respect to the duty ratio D is plotted in FIGS. 3A and 3B for both boost and buck operations, respectively. Finally, it should be noted that when some unipolar ports are sources and others are loads, the power processed by the balancing circuit is the difference between source and load. Therefore, the actual power processed by the converter will be less than the theoretical value analyzed above.

Example Application: DC Distribution System

Figure 4:
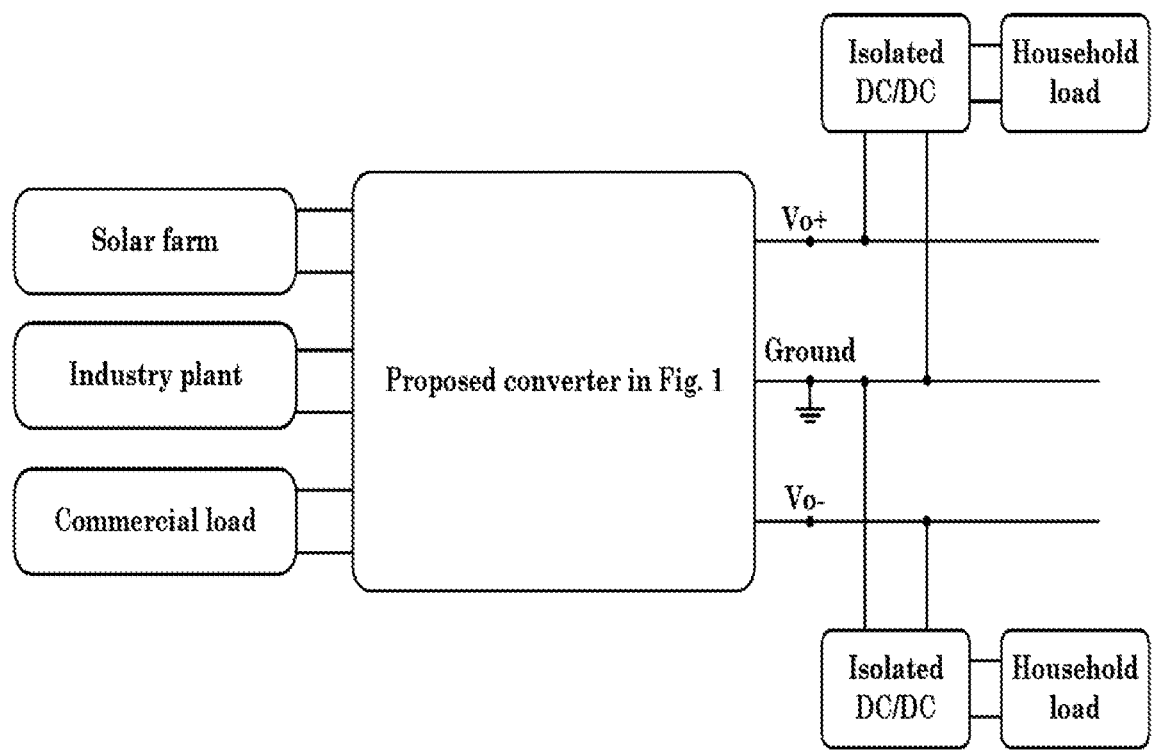
FIG. 4 shows a DC microgrid architecture using the inventive DC/DC converter as distribution system according to embodiments of the present invention.

The inventive DC/DC converter is suitable for DC distribution systems where both unipolar and bipolar are present. The inventive DC/DC converter system can interconnect the two systems while the unipolar system can have multiple power sources or loads. For example, a DC microgrid architecture using the proposed DC/DC converter is given in FIG. 4. The unipolar side is connected to large scale power source or load, while the bipolar side can supply power to the household loads via secondary isolated DC/DC converters.

As the household loads may be unbalanced, an extra balancing circuit is required to process the unbalanced power if a traditional DC/DC converter is used, undermining system efficiency. With the inventive converter, the balancing circuit inside the proposed converter will also provide voltage balancing function without increasing the processed power.

Example Application: Combination with DC/AC inverter

Figure 5A:
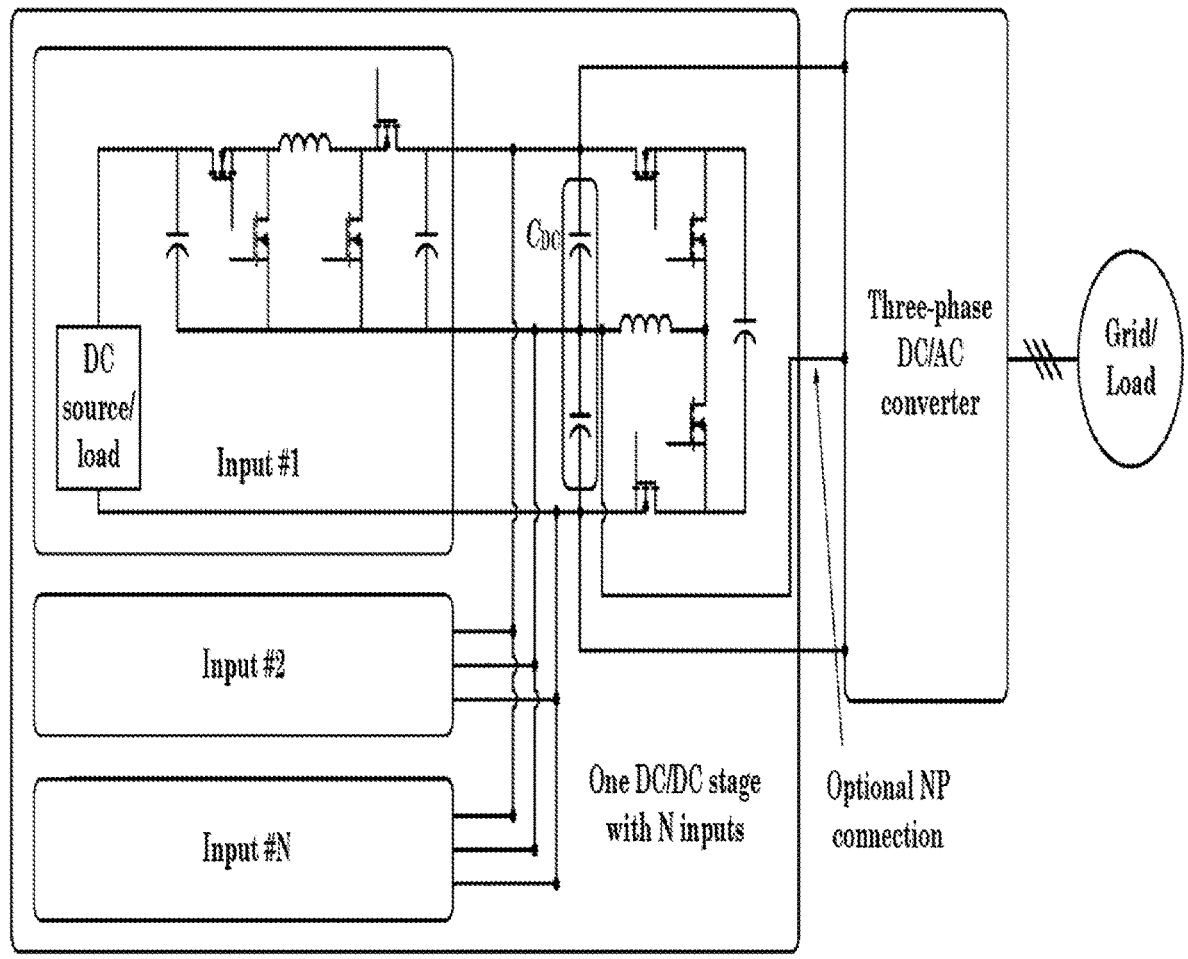
FIG. 5A shows a basic system topology according to embodiments of the present invention with the inventive multi-input DC/DC converter with a three-phase DC/AC converter.
Figure 5B:
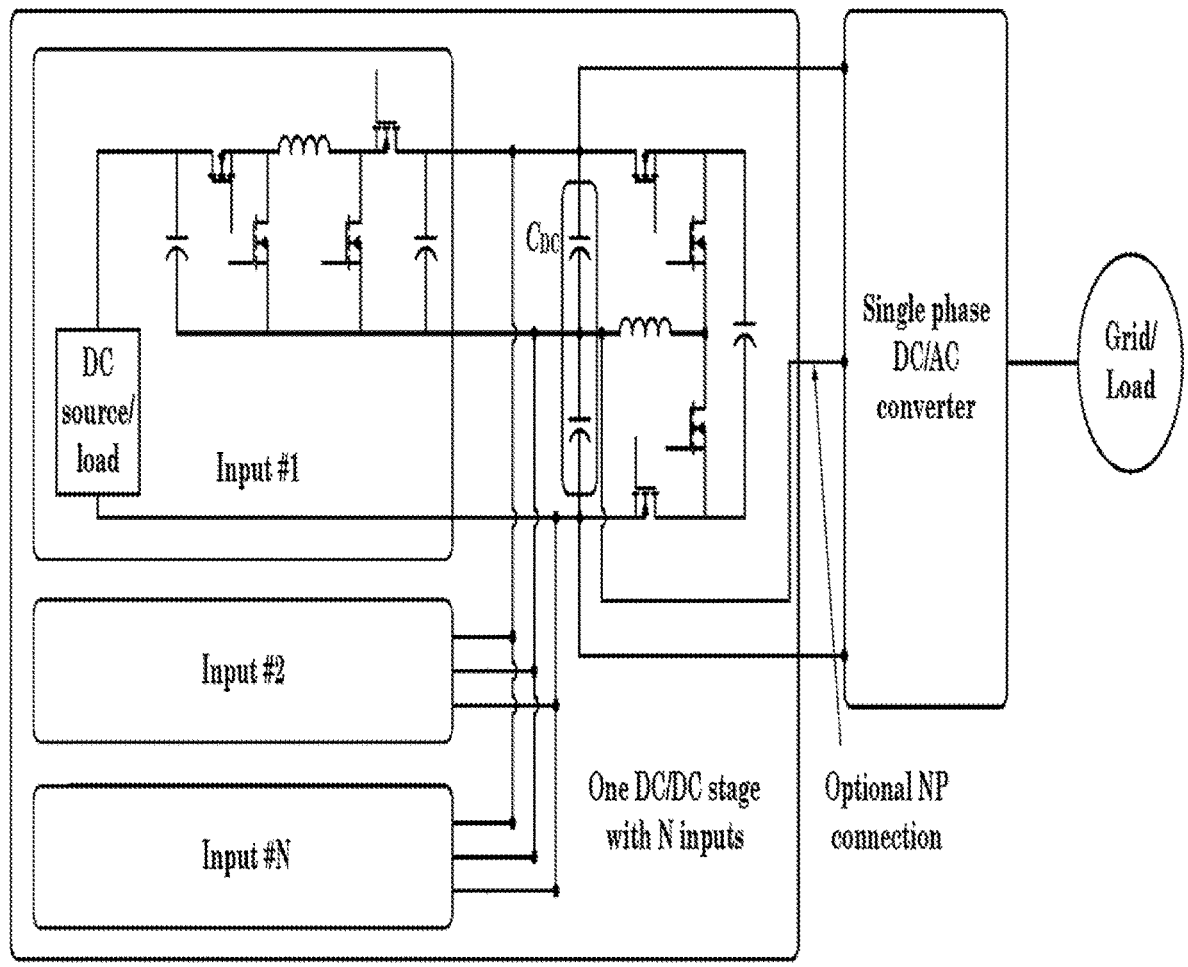
FIG. 5B shows a basic system topology with the inventive multi-input DC/DC converter according to embodiments of the present invention with a single-phase DC/AC converter.
Figure 6F:
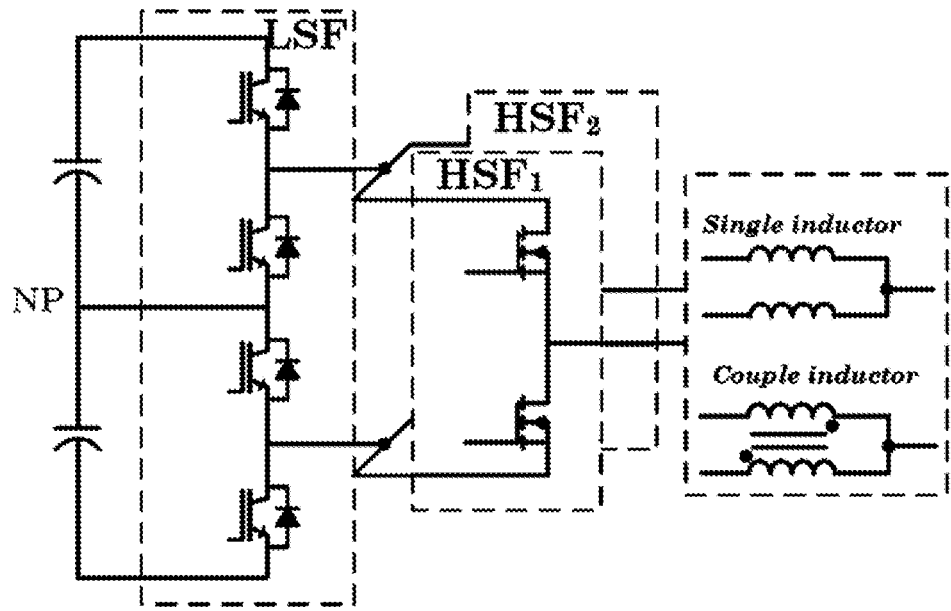
Figure 6G:
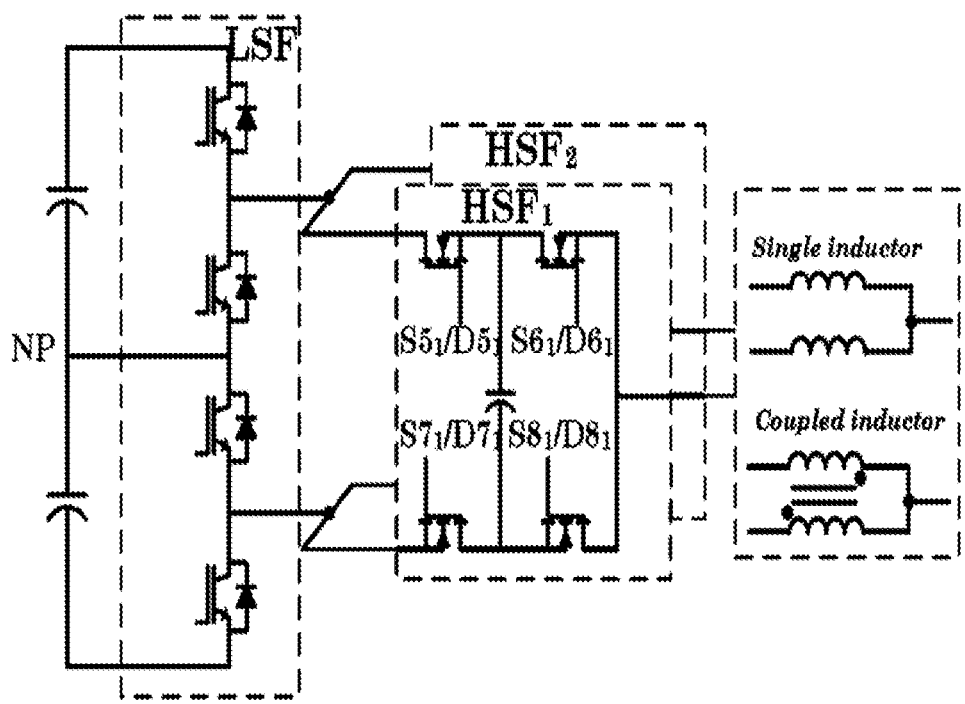

The inventive DC/DC converter can be applied in solar inverter, grid-tied energy storage system, hybrid solar/battery system, and electric vehicle drives. The DC distribution system may also be connected to the AC grid through a DC/AC converter, forming a hybrid AC/DC microgrid. In these applications, a DC/AC converter is further connected to the proposed DC/DC converter. The DC/AC converter can be a simple two-level converter or a multilevel converter in either single phase or three-phase configuration. If the DC/AC converter has one or more neutral points (NP), the balancing circuit can be considered as a shared part of DC/DC and DC/AC converters. As an example, the basic structure of the system is given in FIGS. 5A and 5B, with FIG. 5A showing an embodiment of a multi-input DC/DC converter with three-phase DC/AC converter, and FIG. 5B showing an embodiment of a multi-input DC/DC converter with a single-phase DC/AC converter. The total number of DC sources or loads is N. For simplicity, only one balancing circuit is shown. Some examples of single phase-leg DC/AC converter topologies are given in FIGS. 6A-6G, with FIG. 6A showing a two-level converter, FIG. 6B showing an NPC, FIG. 6C showing a 3L ANPC, FIG. 6D showing a TNPC, FIG. 6E showing a 5L ANPC, FIG. 6F showing a HB-IPC, and FIG. 6G showing a FC-IPC.

As the balancing circuit will be switched at a much higher frequency than the third-order of fundamental frequency, e.g., 150 Hz or 180 Hz for grid tied applications and as low as a few Hz for motor drive applications, it will significantly reduce the low-frequency voltage ripple in the DC neutral point. As such, a smaller capacitance can be used at the DC link, which will improve the efficiency, reliability, and density of the system.

Figure 7:
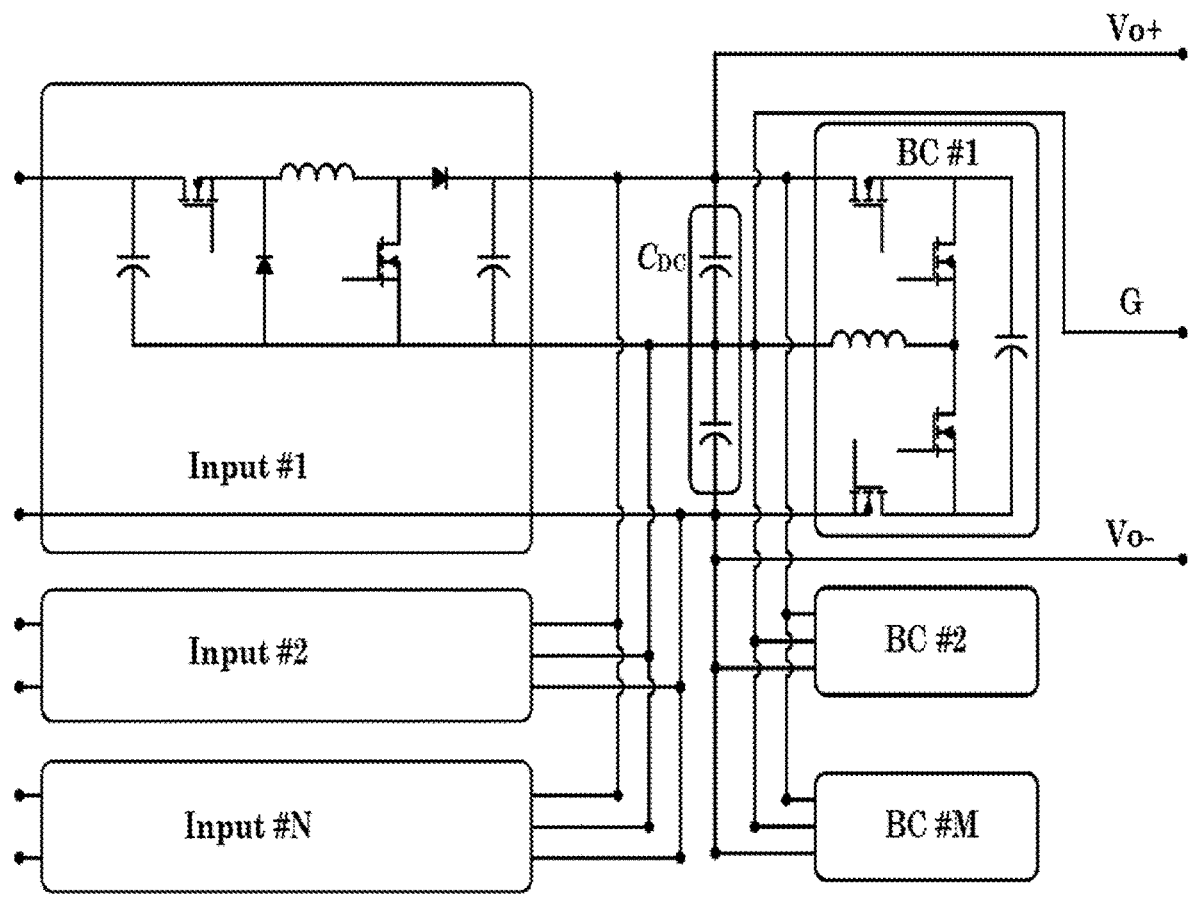
FIG. 7 shows a unidirectional version of the inventive DC/DC converter system according to embodiments of the present invention.

The inventive circuit is also suitable for solar inverters with multi-string input capability. For a solar string inverter application, a unidirectional embodiment of the inventive DC/DC converter system, as shown in FIG. 7, can be used. The DC/DC stage will function as maximum power point tracking (MPPT). In this application, $V_{DC}$ usually varies within a range. In the state-of-the-art solar inverter where maximum DC input is 1500 VDC and rated output is 800 VAC, operating DC link voltage $V_{DC}$ can vary between 1300V and 1500V. The solar string voltage, i.e., $v_{s,i}$ changes in a much wider range, e.g. 300V to 1500V. If $v_{s,i}$ is lower than 650V, the MPPT stops operating to improve energy efficiency. When the string voltage is higher than 650V, the MPPT will start. In real world applications, it is possible that one solar string outputs 1500V voltage while another one only outputs 660V due to shading. Depending on the desired DC link voltage, the interfacing converter of the 660V string can be bypassed or operated in boost mode. But the maximum available DC link voltage will be restrained to 1300V to 1320V. If the DC link voltage is 1320V, the converter is bypassed so that the string is directly connected to the lower DC capacitor, the balancing circuit will maintain DC link voltage at 1320V, while the 1500V string can be stepped down to 1320V with the interfacing converter operating as a buck converter. However, if the DC link voltage is 1300V, the interfacing converter of the 660V string will operate as a boost converter to step 10V (=660V−650V) to 650V, and the interfacing converter of the 1500V string will still operate as a buck converter.

A similar DC/DC stage can be found in [13], using only a boost converter to interface a DC source. This topology can only interface one DC source or load. Moreover, it cannot be applied in multi-input applications even with multiple converters in parallel. For the above example, the 1500V string cannot be stepped down to 1320V with the topology in [13]. As a result, both strings will not operate properly. Furthermore, an extra hardware combiner will be mandatory for voltage adapting, resulting in significantly higher cost. Moreover, for 1500V solar PV applications, this topology cannot provide full MPPT range. When the solar string voltage is higher than the nominal inverter DC link voltage, i.e., 1300V to 1400V, the boost converter will be bypassed. However, with the proposed converter, a full MPPT range from 650V to 1500V will be available.

Case Study Demonstration Results

Figure 8A:
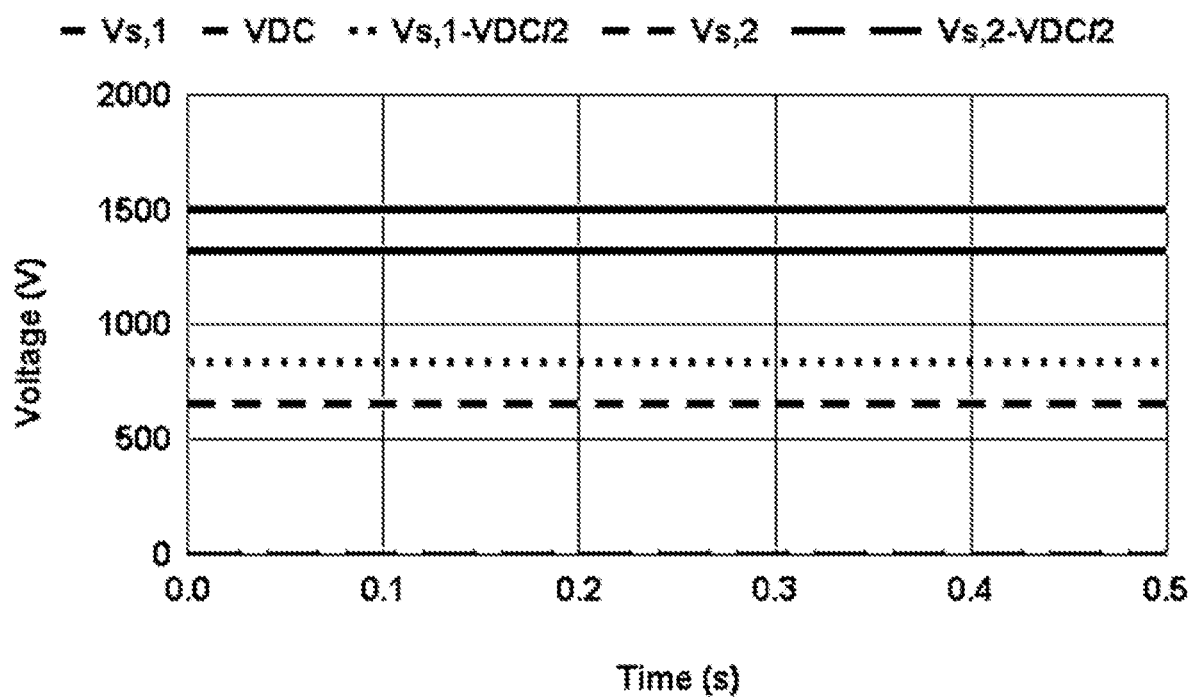
FIG. 8A is a graph showing steady state results with two different DC input voltages with a regulated DC link voltage of 1300V.
Figure 8B:
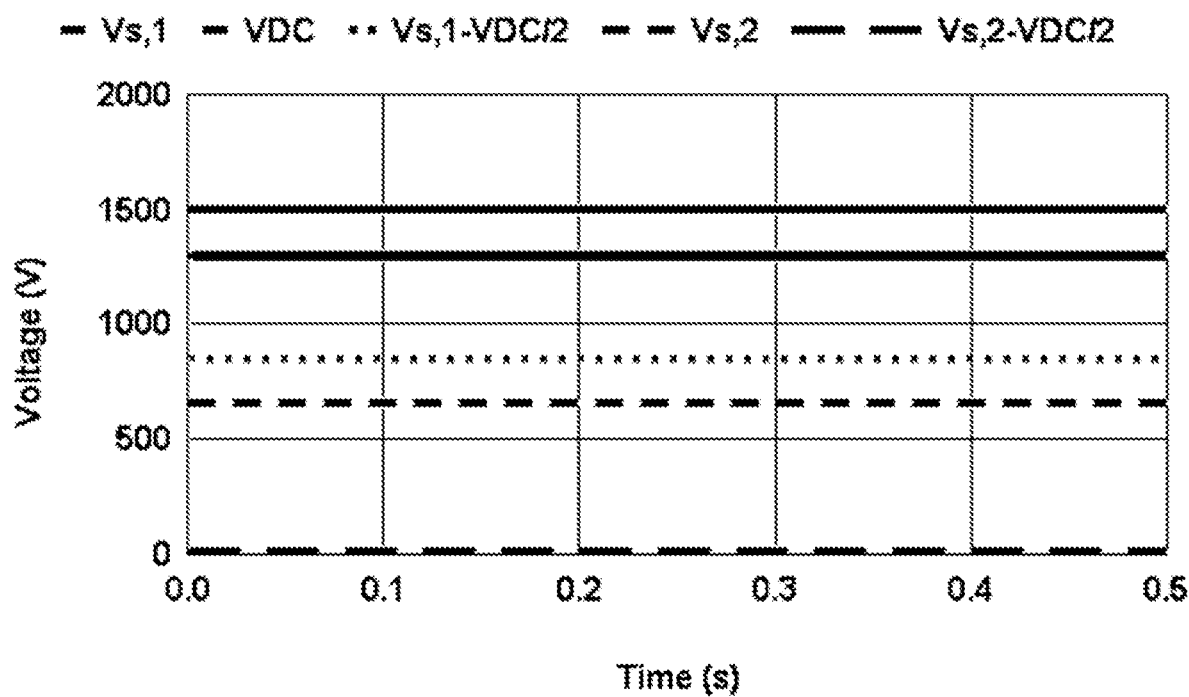
FIG. 8B is a graph showing steady state results with two different DC input voltages with a regulated DC link voltage of 1320V.

Several cases were simulated to verify the principle of the inventive solution. First, steady state results are shown in FIGS. 8A and 8B for the operation status described above. In FIG. 8A, $V_{s,1}$ is 1500V, $V_{s,2}$ is 660V, and $V_{DC}$ is 1300V. It can be seen that $V_{DC}$ can be regulated at the desired value, though the two input voltages have a large difference. For input #2, the voltage at the input capacitor, $V_{s,2}-V_{DC}/2$, is 10V (660V-1300V/2), which indicates an extreme condition where the step-up ratio is 65 and device duty cycle is 0.985. In this case, the interfacing buck-boost converter can be simply bypassed. The result is given in FIG. 8B. As can be seen, the input capacitor voltage of input #2 becomes 0 due to the bypass operation. The DC link voltage $V_{DC}$ is regulated at 1320V, as the balancing circuit doubles the voltage of input #12. The voltage of input #1 is stepped-down to 1320V from 1500V, with a more reasonable duty ratio at 0.786.

Figure 9:
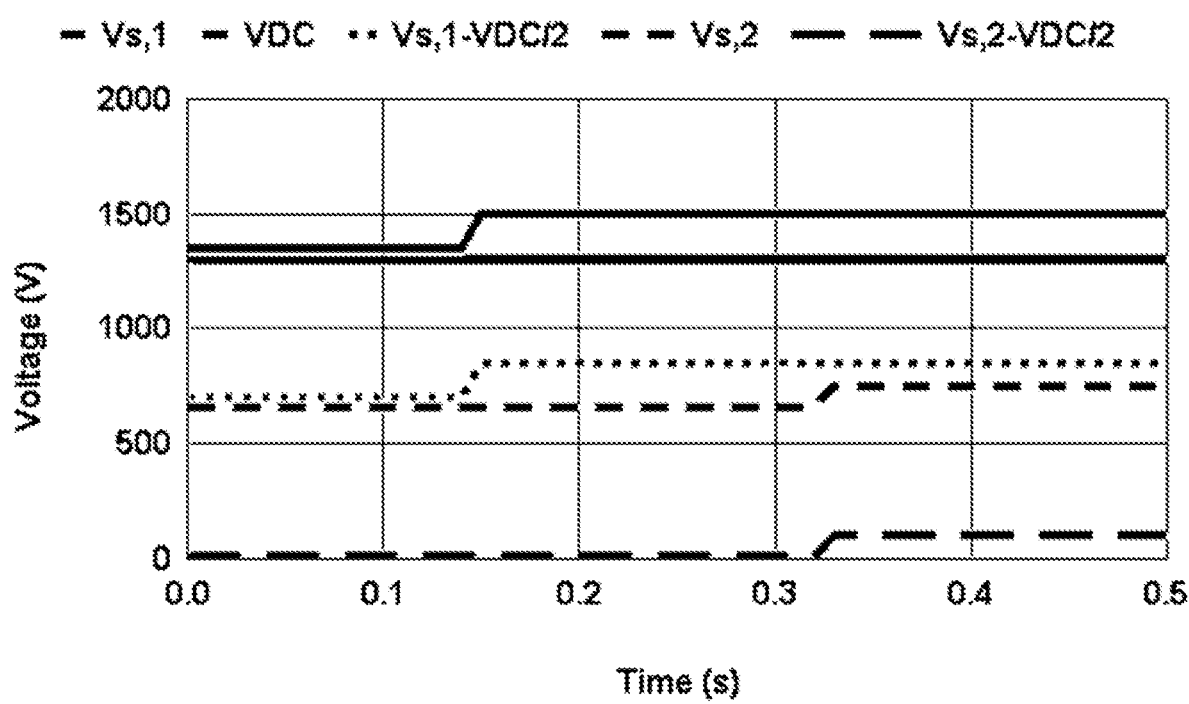
FIG. 9 is a graph showing simulation results with a step change in both input voltages.

The result with a step change in both inputs is given in FIG. 9, where $V_{s,1}$ was changed from 1350V to 1500V, afterwards $V_{s2}$ was also increased from 660V to 750V. It is clear that the DC link voltage can be regulated stable at 1300V.

Figure 10A:
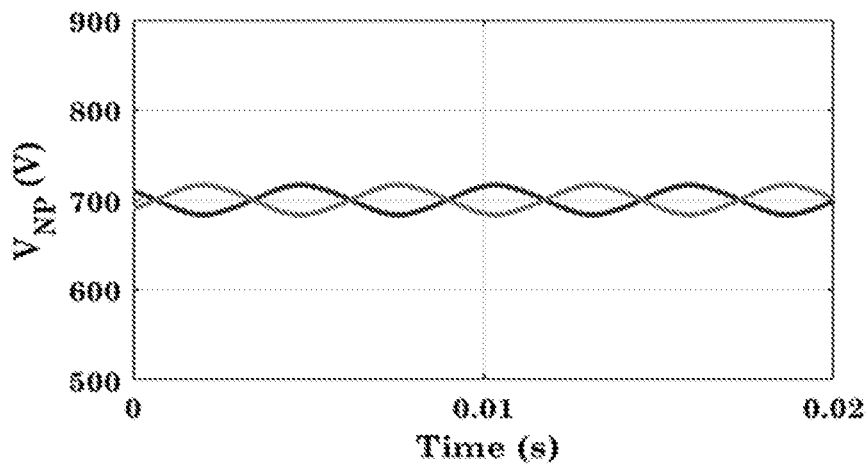
FIG. 10A is a graph showing DC link neutral point ripple results of 1500 uF capacitance without balancing circuit.
Figure 10B:
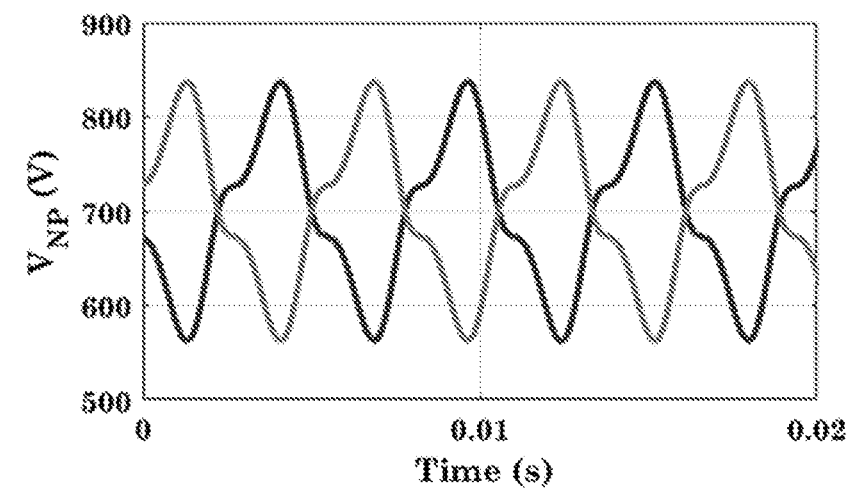
FIG. 10B is a graph showing DC link neutral point ripple results of 150 uF capacitance without balancing circuit.
Figure 10C:
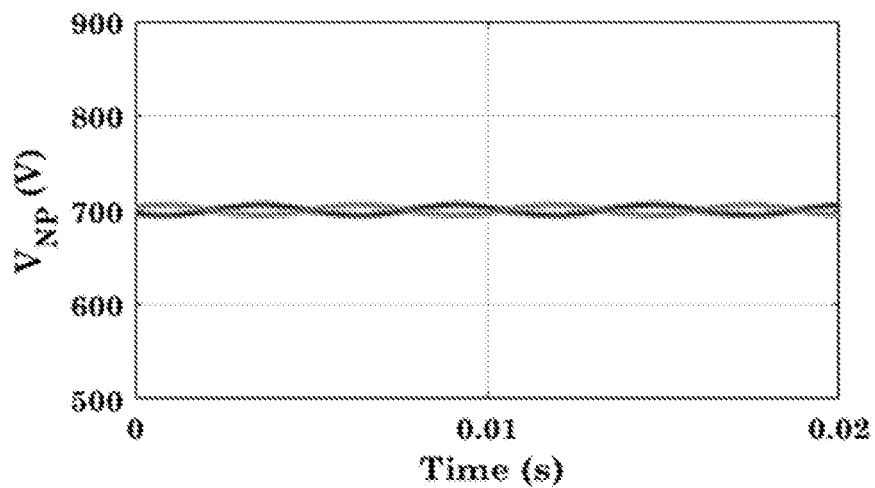
FIG. 10C is a graph showing DC link neutral point ripple results of 150 uF capacitance with balancing circuit.

The benefit of the balancing circuit was verified in simulation. The HB-IPC was used as DC/AC stage. Without a balancing circuit, the neutral point voltage ripple is shown in FIG. 10A when both upper and lower DC link capacitors are 1500 uF. If the capacitance is reduced to 150 uF, the ripple will be significantly increased as shown in FIG. 10B. However, if a balancing circuit is added, the ripple with 150 uF capacitance can be even smaller than that with 1500 uF but without balancing circuit, as shown in FIG. 10C. The reduced low-frequency neutral point ripple substantially reduces the low-order harmonics in the AC output current and eased the control effort for DC voltage regulation.

The efficiency of the converter has been verified based on the datasheet of SiC mosfet C3M0065100K. The considered system parameters are given as follows. The devices in buck-boost stage switch at 75 kHz. The inductor in the buck-boost converter is 200 uH. The devices in the balancing circuit stage switch at 15 kHz. The resonant capacitor and inductor are 2.5 uF and 50 uH, respectively.

The efficiency curves in boost operation are given for different input voltages. The output voltage is 1500V in order to maximize the voltage stress over the device. When the input voltage is high, the efficiency is generally higher as less power is processed by the converter. However, under a light load condition, a lower input voltage leads to higher efficiency. The reason is that at low voltage input, the balancing circuit processes more power. But based on Equation 4, the power processed by the buck-boost converter becomes less. As a result, the total power loss is smaller at light load. However, under a heavy load condition, the conduction loss in the balancing circuit increases significantly, and thus the efficiency becomes lower.

The efficiency curves in buck operation are generated. The input voltage is set to 1500V. It can be seen that with lower output voltage, the efficiency is lower as the duty cycle drops, and the converter processes more power. When the output voltage is 880V, the duty cycle is 0.415, which is lower than 0.5. The power processed by the converter is even higher than the input power, as given in FIG. 3B. As a consequence, the efficiency drops significantly.

Generalized Topologies

Figure 11:
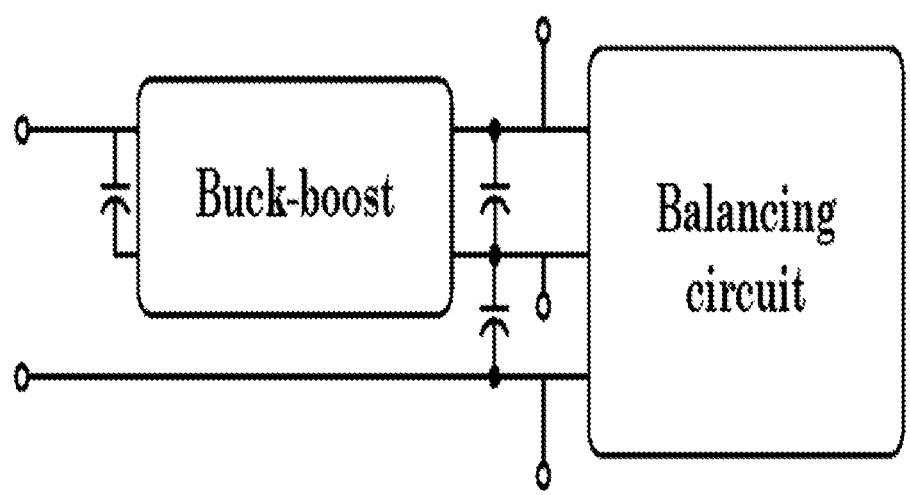
FIG. 11 shows a generalized form of a single port inventive topology according to embodiments of the present invention.
Figure 12A:
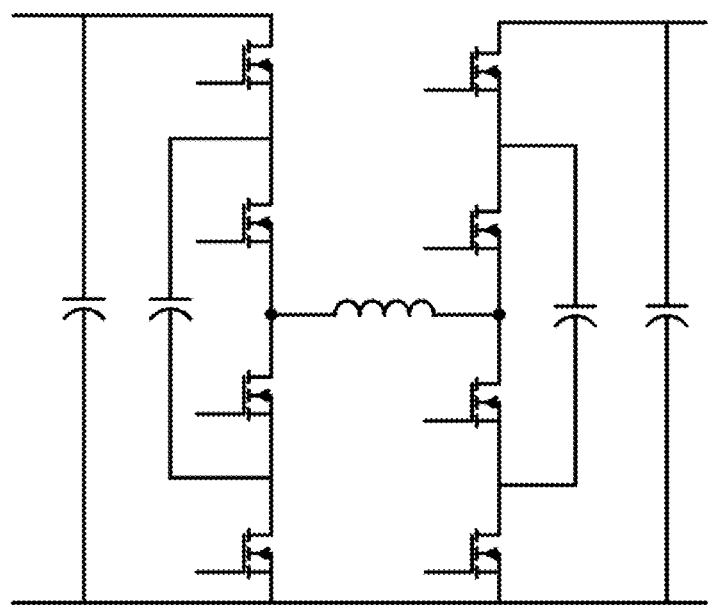
FIG. 12A shows a three-level buck-boost converter circuit applicable according to embodiments of the present invention.
Figure 12B:
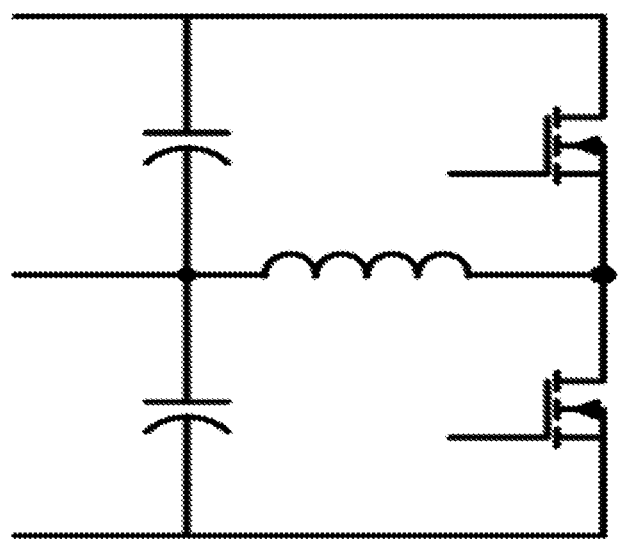
FIG. 12B shows a half-bridge balancing circuit applicable according to embodiments of the present invention.
Figure 13:
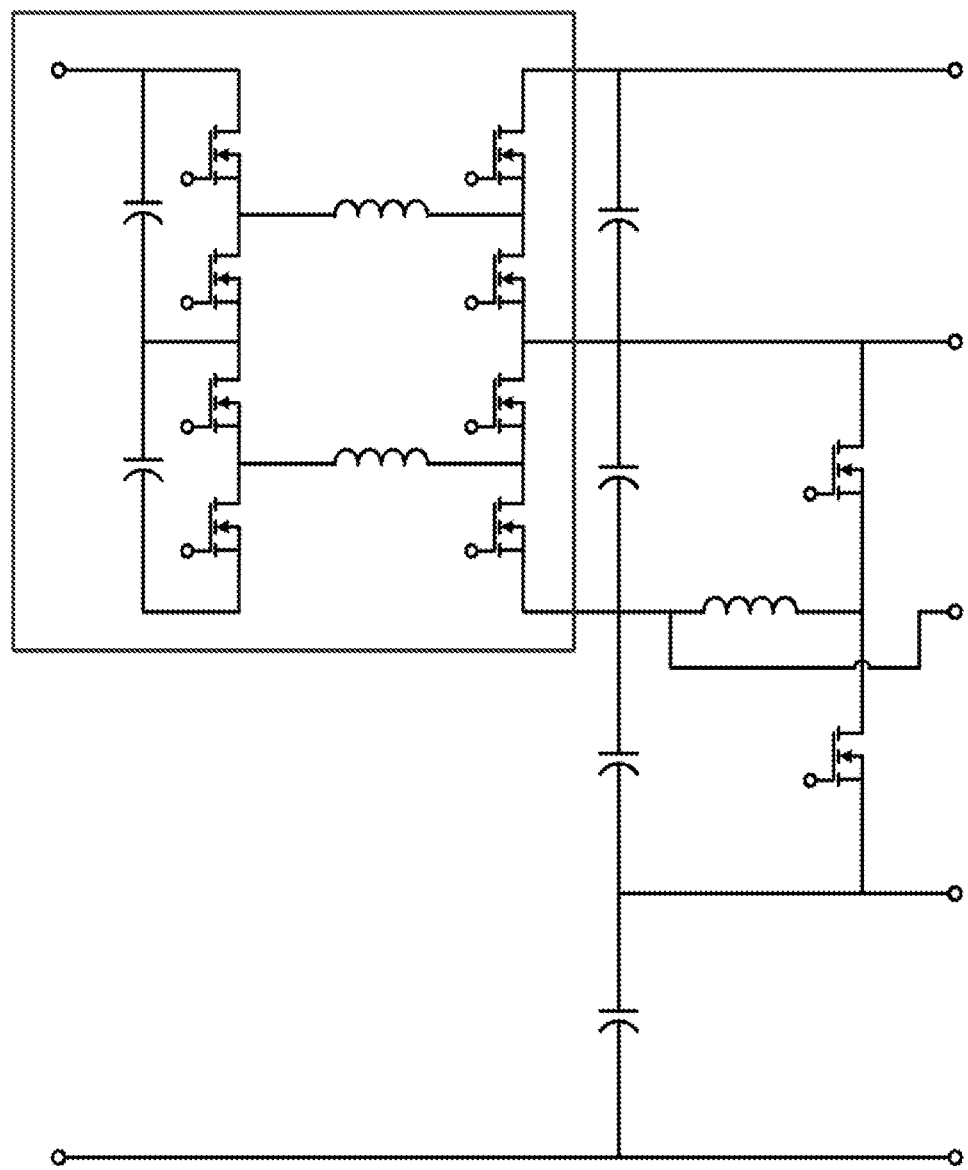
FIG. 13 shows an embodiment according to the present invention with four balanced series-capacitors in DC link.

The basic topologies can be generalized into the form shown in FIG. 11. Alternative buck-boost circuits and balancing circuits are shown in FIGS. 12A and 12B with a three-level buck-boost converter shown in FIG. 12A and a half-bridge balancing circuit shown in FIG. 12B, respectively. Another embodiment using a different type of buck-boost converter is shown in FIG. 13. This converter has the ability to balance four series connected DC sources, which may be seen in some multilevel inverters. Other generalizations can be derived in a similar way.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

REFERENCES

[1] V. A. K. Prabhala, P. Fajri, V. S. P. Gouribhatla, B. P. Baddipadiga and M. Ferdowsi, "A DC-DC Converter With High Voltage Gain and Two Input Boost Stages," in IEEE Transactions on Power Electronics, vol. 31, no. 6, pp. 4206-4215, June 2016.

[2] L. Yu and H. Wang, "A Novel Dual-Input ZVS DC/DC Converter for Low-Power Energy Harvesting Applications," IEEE Journal of Emerging and Selected Topics in Power Electronics, vol. 7, no. 2, pp. 1197-1206, June 2019.

[3] K. Filsoof and P. W. Lehn, "A Bidirectional Multiple-Input Multiple-Output Modular Multilevel DC-DC Converter and its Control Design," IEEE Transactions on Power Electronics, vol. 31, no. 4, pp. 2767-2779, April 2016.
[4] F. Kardan, R. Alizadeh and M. R. Banaei, "A New Three Input DC/DC Converter for Hybrid PV/FC/Battery Applications," in IEEE Journal of Emerging and Selected Topics in Power Electronics, vol. 5, no. 4, pp. 1771-1778, December 2017.
[5] X. Sun, Y. Zhou, W. Wang, B. Wang and Z. Zhang, "Alternative Source-Port-Tolerant Series-Connected Double-Input DC-DC Converter," in IEEE Transactions on Power Electronics, vol. 30, no. 5, pp. 2733-2742, May 2015.
[6] K. Varesi, S. Hossein Hosseini, M. Sabahi, E. Babaei, S. Saeidabadi and N. Vosoughi, "Design and Analysis of a Developed Multiport High Step-Up DC-DC Converter With Reduced Device Count and Normalized Peak Inverse Voltage on the Switches/Diodes," in IEEE Transactions on Power Electronics, vol. 34, no. 6, pp. 5464-5475, June 2019.
[7] A. Ganjavi, H. Ghoreishy and A. A. Ahmad, "A Novel Single-Input Dual-Output Three-Level DC-DC Converter," in IEEE Transactions on Industrial Electronics, vol. 65, no. 10, pp. 8101-8111, October 2018.
[8] J. Zhao, K. Yeates and Y. Han, "Analysis of high efficiency DC/DC converter processing partial input/output power," 2013 IEEE 14th Workshop on Control and Modeling for Power Electronics (COMPEL), Salt Lake City, Utah, 2013, pp. 1-8.
[9] J. R. R. Zientarski, M. L. da Silva Martins, J. R. Pinheiro and H. L. Hey, "Evaluation of Power Processing in Series-Connected Partial-Power Converters," in IEEE Journal of Emerging and Selected Topics in Power Electronics, vol. 7, no. 1, pp. 343-352, March 2019.
[10] A. Stippich et al., "Key components of modular propulsion systems for next generation electric vehicles," in CPSS Transactions on Power Electronics and Applications, vol. 2, no. 4, pp. 249-258, December 2017.
[11] M. Schuck, A. D. Ho and R. C. N. Pilawa-Podgurski, "Asymmetric Interleaving in Low-Voltage CMOS Power Management With Multiple Supply Rails," IEEE Transactions on Power Electronics, vol. 32, no. 1, pp. 715-722, January 2017.
[12] C. Schaef, B. Reese, C. R. Sullivan and J. T. Stauth, "Design aspects of multi-phase interleaved resonant switched-capacitor converters with mm-scale air-core inductors," 2015 IEEE 16th Workshop on Control and Modeling for Power Electronics (COMPEL), Vancouver, BC, 2015, pp. 1-5.
[13] B. Stevanović, D. Serrano, M. Vasić, P. Alou, J. A. Oliver and J. A. Cobos, "Highly Efficient, Full ZVS, Hybrid, Multilevel DC/DC Topology for Two-Stage Grid-Connected 1500V PV System with Employed 900V SiC Devices," IEEE Journal of Emerging and Selected Topics in Power Electronics.

The invention claimed is:

1. A non-isolated DC-to-DC converter for connecting a first DC domain to a second DC domain, comprising:
a first set of series connected capacitors between the upper terminal and the neutral point of the second DC domain;
a second set of series connected capacitors between the neutral point and the lower terminal of the second DC domain;
one or a plurality of DC ports in the first DC domain, each port having an upper terminal and a lower terminal with the lower terminal connected to the lower terminal of the second DC domain;
one or a plurality of non-isolated buck boost DC-DC converters, each having a first node connected to the upper terminal of one DC port in the first DC domain, a floating second node, a capacitor bank connected between the first node and the second node, a third node connected to the upper terminal of the second DC domain, and a fourth node connected to the neutral point of the second DC domain; and
one or a plurality of balancing circuits, each having a first node connected to the upper terminal of the second DC domain, a second node connected to the neutral point of the second DC domain, and a third node connected to the lower terminal of the second DC domain.

2. The non-isolated DC-to-DC converter of claim 1 wherein the non-isolated DC converter is a multiport DC/DC converter.

3. The non-isolated DC-to-DC converter of claim 1 wherein the non-isolated DC-to-DC converter is bidirectional.

4. The non-isolated DC-to-DC converter of claim 1 wherein the buck-boost converter is unidirectional.

5. The non-isolated DC-to-DC converter of claim 1 wherein the non-isolated DC-to-DC converter is modular.

6. The non-isolated DC-to-DC converter of claim 1 wherein the non-isolated DC converter includes an output DC neutral point.

7. The non-isolated DC-to-DC converter of claim 6 wherein the non-isolated DC converter is configured for use as a bipolar DC grid.

8. The non-isolated DC-to-DC converter of claim 6 wherein the non-isolated DC converter is configured for use as a front-end of a multilevel DC/AC converter.

9. The non-isolated DC-to-DC converter of claim 6 wherein the non-isolated DC converter is configured for use as a front-end of a two level DC/AC converter.

10. The non-isolated DC-to-DC converter of claim 1 wherein the buck-boost converter includes a plurality of buck-boost converters.

11. The non-isolated DC-to-DC converter of claim 10 wherein the plurality of buck-boost converters are connected in parallel.

12. The non-isolated DC-to-DC converter of claim 10 wherein the plurality of buck-boost converters are interleaved to reduce total output current ripple.

13. The non-isolated DC-to-DC converter of claim 1 wherein the balancing circuit includes a plurality of balancing circuits.

14. The non-isolated DC-to-DC converter of claim 13 wherein the plurality of balancing circuits are interleaved to reduce inductor size.

15. The non-isolated DC-to-DC converter of claim 1 wherein the non-isolated DC-to-DC converter is configured to operate in parallel with other non-isolated DC-to-DC converters.

16. The non-isolated DC-to-DC converter of claim 1 wherein the buck boost converter is a multilevel converter.

17. The non-isolated DC-to-DC converter of claim 1 wherein the neutral point is not connected to external circuit out of the non-isolated DC-to-DC converter.

* * * * *